United States Patent [19]

Morimitsu et al.

[11] Patent Number: 4,879,372
[45] Date of Patent: Nov. 7, 1989

[54] FIBER REACTIVE COMPOUND HAVING SYM-TRIAZINE AND AMINOBENZOYLAMINE MOIETIES

[75] Inventors: Toshihiko Morimitsu, Minoo; Naoki Harada, Suita; Takashi Omura, Ashiya, all of Japan

[73] Assignee: Sumitomo Chemical Company, Limited, Osaka, Japan

[21] Appl. No.: 117,552

[22] Filed: Nov. 6, 1987

[30] Foreign Application Priority Data

Nov. 14, 1986 [JP] Japan .................. 61-272572

[51] Int. Cl.4 .................. C09B 62/085; C09B 62/09; C09B 62/51; C09B 62/513
[52] U.S. Cl. .................. 534/618; 534/598; 534/617; 534/619; 534/622; 534/623; 534/624; 534/625; 534/626; 534/627; 534/628; 534/629; 534/632; 534/633; 534/634; 534/686; 534/637; 534/638; 534/642; 540/140; 544/99; 544/187
[58] Field of Search ........ 534/617, 618, 619, 622–642; 544/187; 540/140

[56] References Cited

U.S. PATENT DOCUMENTS 4,145,340 3/1979 Ripyard .................. 534/638 X
4,703,111 10/1987 Segal et al. .................. 534/638 X
4,725,675 2/1988 Segal et al. .................. 534/638 X
4,731,441 3/1988 Segal et al. .................. 534/638 X Primary Examiner—Floyd D. Higel
Attorney, Agent, or Firm—Stevens, Davis, Miller & Mosher

[57] ABSTRACT

A triazine compound having a dye moiety, a sym-monohalotriazine moiety and an aminobenzoylamine moiety, which is represented, for example, by the following formula,

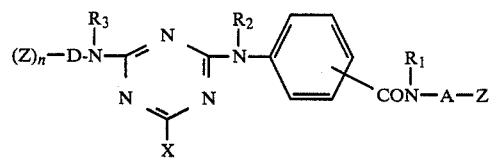

wherein $R_1$, $R_2$ and $R_3$ are independently hydrogen or alkyl, A is phenylene or naphthylene, D is a dye moiety, X is chloro or fluoro, Z is $-SO_2CH=CH_2$, $-SO_2CH_2CH_2OSO_3H$ or the like, and n is 0, 1 or 2, and which is useful for dyeing or printing fiber materials such as cellulose fiber materials with superior dye performance such as build-up property to give dyed or printed products excellent is fastness properties.

8 Claims, No Drawings

FIBER REACTIVE COMPOUND HAVING SYM-TRIAZINE AND AMINOBENZOYLAMINE MOIETIES

The present invention relates to a fiber reactive compound, a process for producing the same and a process for dyeing or printing fiber materials.

Reactive dyes, particularly those having a so-called vinylsulfone type fiber reactive group, have been extensively used for dyeing or printing cellulose and polyamide fiber materials, because of their superior dye performance. Of these, reactive dyes having both monochlorotriazinyl and the vinylsulfone type fiber reactive groups such as those disclosed in, for example, U.S. Pat. Nos. 4,540,418, 4,548,612 and the like are prominent.

However, there are now strongly desired to develop reactive dyes meeting needs of higher level for the dyeing performance including solubility, build-up property, washing-off property and insusceptibility to dyeing temperature, as well as fastness properties including acid-hydrolysis fastness and chlorine fastness.

The present inventors have undertaken extensive studies to find a compound meeting such needs, and as a result found a specific compound.

The present invention provides a triazine compound having (1) a dye moiety, (2) at least one symtriazine moiety of the following formula (I),

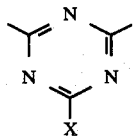
(I)

wherein X is chloro or fluoro, and (3) at least one aminobenzoylamine moiety of the following formula (II),

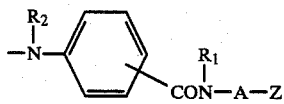
(II)

wherein $R_1$ and $R_2$ independently of one another are each hydrogen or unsubstituted or substituted alkyl, A is unsubstituted phenylene or unsubstituted or substituted naphthylene, and Z is $-SO_2CH=CH_2$ or $-SO_2CH_2CH_2Y$ in which Y is a group splittable by the action of an alkali, and a process for producing the above-defined triazine compound, which comprises subjecting any one of a dye capable of imparting the desired dye moiety and an aminobenzoylamine compound of the following formula (III),

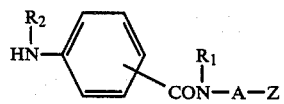
(III)

wherein $R_1$, $R_2$, A and Z are as defined above, to first condensation with cyanuric chloride or fluoride, followed by second condensation with the remaining one of the above two.

The present invention also provides a process for dyeing or printing fiber materials, which comprises using the above-defined triazine compound.

Among the triazine compounds of the present invention, preferred are those constituted in a manner such that the dye moiety bonds to the one hand of the sym-triazine moiety through an unsubstituted or substitited imino bridging group, and the aminobenzoylamine moiety bonds to the other hand of the sym-triazine moiety.

More specifically, preferred is a compound represented by the following formula (1),

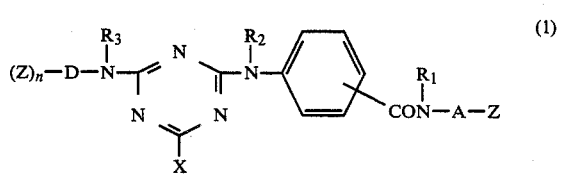
(1)

wherein $R_1$, $R_2$, A, X and Z are as defined above, $R_3$ is hydrogen or unsubstituted or substituted alkyl, D is an anionic dye moiety, and n is 0, 1 or 2. Of these, particularly preferred is a case where $R_1$, $R_2$ and $R_3$ are each hydrogen, X is chloro, A is unsubstituted phenylene, and Z is $-SO_2CH_2CH_2OSO_3H$ or $-SO_2CH=CH_2$. In the above preferred embodiments, much preferred is a case where n is 0.

In the present invention, the alkyl represented by $R_1$, $R_2$ and $R_3$ is preferably the one having 1 to 4 carbon atoms and unsubstituted or substituted with hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo or sulfamoyl. Preferred examples of such alkyl are those described in Published Unexamined Japanese Patent Application No. 122549/1984. Particularly preferred $R_1$, $R_2$ and $R_3$ are, independently of one another, each hydrogen, methyl or ethyl.

Examples of the phenylene represented by A are as follows.

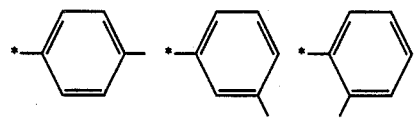

In the above formulas, the asterisked linkage bonds to

The naphthylene represented by A may be unsubstituted or substituted by sulfo and includes, for example,

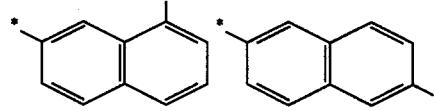

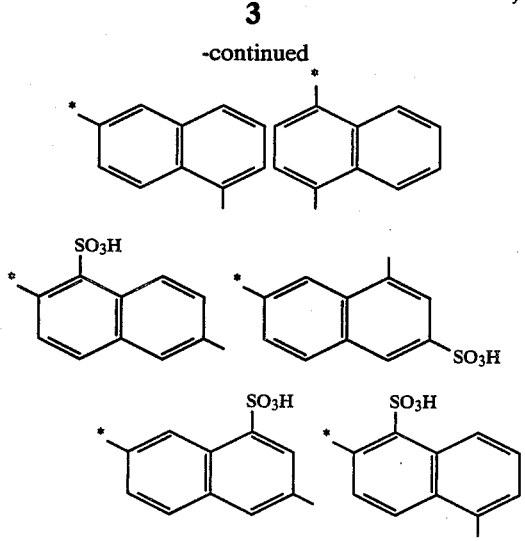

in the above formulas, the asterisked linkage has the same meaning as described above.

The symbol Y in —SO$_2$CH$_2$CH$_2$Y which is represented by Z is a group capable of being split by the action of an alkali, and includes, for example, —OSO$_3$H, —SSO$_3$H, —PO$_3$H$_2$, —Cl, —OCOCH$_3$ and the like. Of these groups represented by Z, preferred are —SO$_2$CH=CH$_2$ and —SO$_2$CH$_2$CH$_2$OSO$_3$H.

The triazine compound in accordance with the present invention is not particularly limited with respect to the dye moiety and any structure other than the sym-triazine and aminobenzoylamine moieties.

With respect to the dye moiety, however, preferred is an anionic dye moiety represented by D in the formula (1). The anionic dye includes, for example, metal-containing or metal-free azo dyes, anthraquinone dyes, metal phthalocyanine dyes, metal formazan dyes, dioxazine dyes, stilbene dyes and the like. Examples of the dye moieties are those as disclosed in Published Unexamined Japanese patent application No. 173060/1985. Of these, particularly preferred D are those represented by the following formulas (A) to (M) in each free acid form:

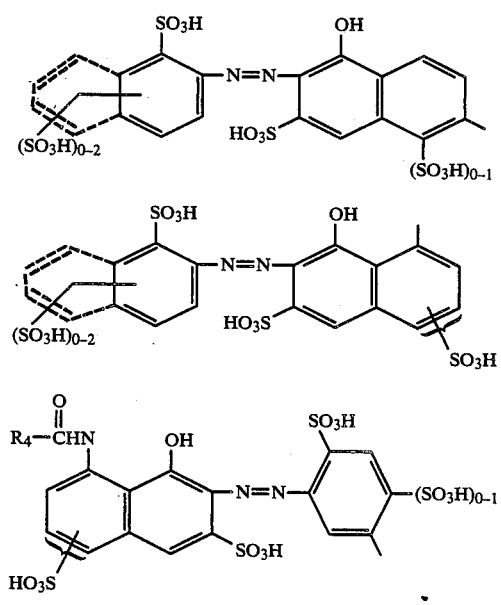

wherein R$_4$ is C$_{1-4}$ alkyl or phenyl unsubstituted or substituted by chloro, sulfo or nitro;

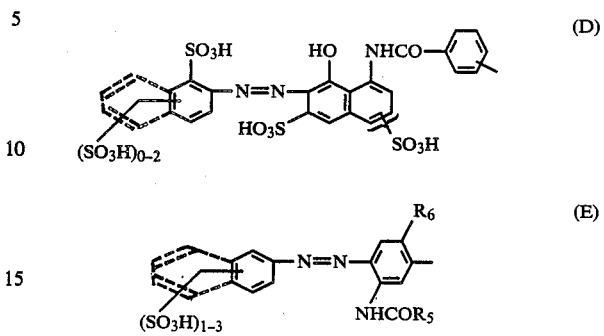

wherein R$_5$ is amino, C$_{1-4}$ alkyl or phenyl, and R$_6$ is hydrogen, C$_{1-4}$ alkyl or C$_{1-4}$ alkoxy;

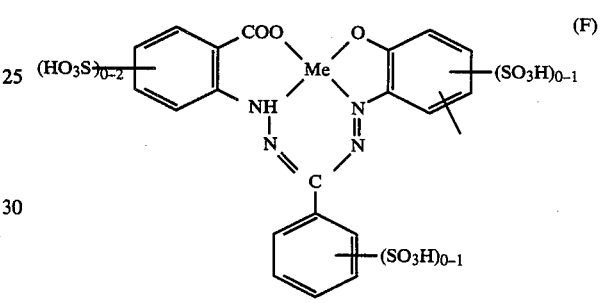

wherein Me is Cu, Ni or Co, preferably Cu;

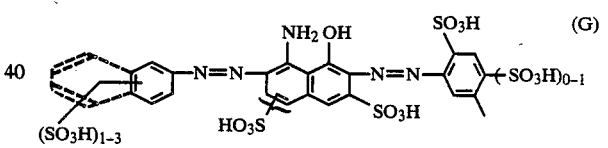

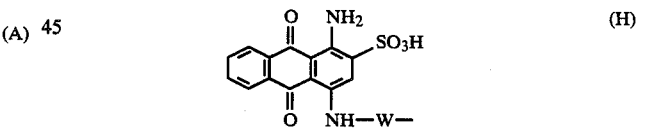

wherein W is C$_{2-6}$ alkylene or a divalent group of the formula,

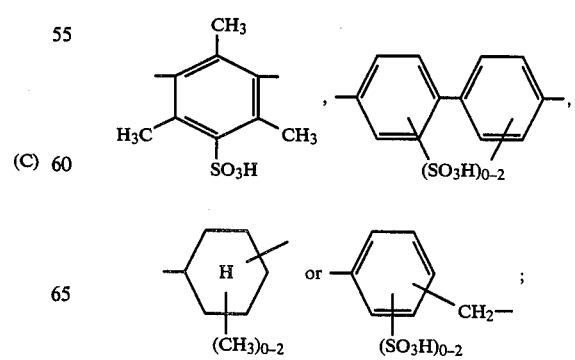

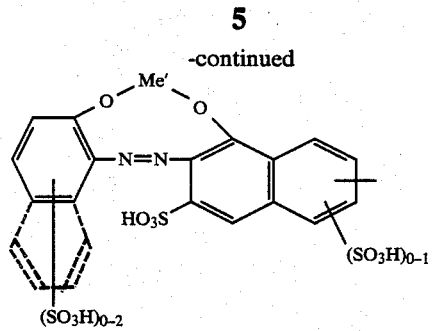

(I) 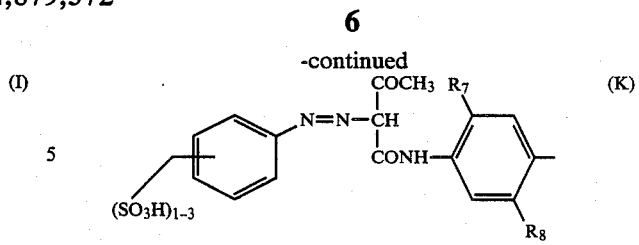

(K) 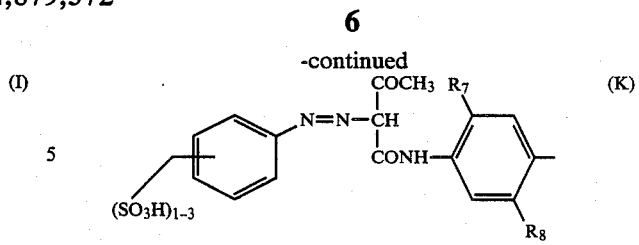

wherein $R_7$ and $R_8$ independently of one another are each sulfo or $C_{1-4}$ alkoxy;

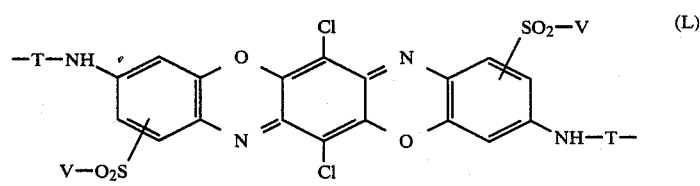
(L)

wherein V is hydroxy, vinyl or ⊕-sulfatoethyl, and T is wherein Me' is Cu, Ni, Co1/2 or Cr1/2, preferably Cu, $C_{2-6}$ alkylene or  ; and

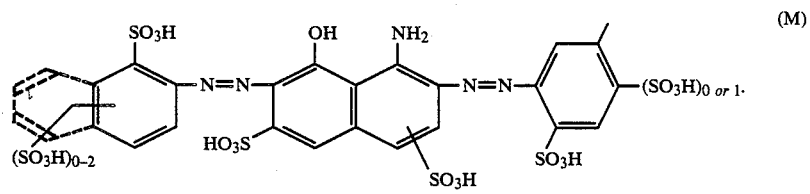
(M)

Co1/2 or Cr1/2;

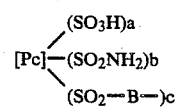 (J)

wherein Pc is copper phthalocyanine or nickel phthalocyanine moiety, preferably copper phthalocyanine, a, b and c satisfy the following formulas, $1 \leq a \leq 2$, $0 \leq b \leq 2$, $1 \leq c \leq 2$ and $a+b+c \leq 4$, and B is a divalent group of the following formula,

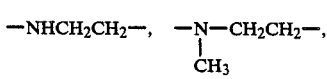

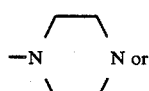

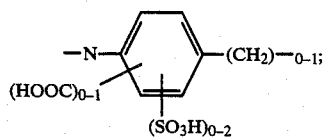

In addition, the phenyl or naphthyl of the diazo component in the formulas (A), (B), (D), (E), (G), (I), (K) and (M) may be additionally substituted by vinylsulfonyl ($-SO_2CH=CH_2$), β-sulfatoethylsulfonyl ($-SO_2CH_2CH_2OSO_3H$), $C_{1-4}$ alkyl, $C_{1-4}$ alkoxy, halogeno, nitro or carboxy.

The triazine compound of the present invention can be produced using an organic dye capable of imparting the desired dye moiety, preferably the anionic dye described above, the aminobenzoylamine compound of the formula (III), and cyanuric chloride or fluoride in a manner known per se. Alternatively, the cyanuric chloride or fluoride can be used in the course of the production of the organic dye capable of imparting the desired dye moiety. For example, cyanuric chloride can be subjected first to condensation with a coupling component, followed by coupling with a diazo component. Successively, the resulting halogenotriazine compound can be subjected to condensation with the aminobenzoylamine compound of the formula (III). In this manner, the triazine compound of the present invention can be also produced.

The preferred triazine compound of the formula (1) can be produced likewise, for example, by subjecting any one of the aminobenzoylamine compound of the formula (III) and a compound of the following formula (IV),

$$(Z)_n-D-NH \quad (IV)$$

wherein $R_3$, D, Z and n are as defined above, to first condensation with the cyanuric chloride or fluoride, and then subjecting the resulting condensate to second condensation with the remaining of the above two. The condensation reaction conditions are those known by the skilled in this art.

After completion of the reactions, the desired triazine compound-containing reaction mixture may be subjected to salting-out in a conventional manner, demineralization with a semipermeable membrane, evaporation such as spray-drying or the like, if desired, with use of usual auxiliary agents such as stabilizing agents, dyeing improvers and the like, to provide a pulverulent or liquid commercial product.

The triazine compound in accordance with the present invention may be in the form of a free acid or a salt of an alkali metal or alkaline earth metal, preferably in the form of sodium or potassium salt.

The triazine compound of the present invention is fiber-reactive and useful for dyeing or printing hydroxyl group-containing and amide group-containing materials. The materials are favorably in a fibrous form.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the triazine compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt suitable for promoting the exhaustion may be added to a dye bath before or after temperature reaching a desired level for the dyeing, if desired, dividedly.

The padding can be carried out by padding the fiber materials at ambient temperature or an elevated temperature, and after drying, steaming or dry-heating the materials to perform the dye-fixation.

The cold batch-up dyeing can be carried out by padding the fiber materials with a padding liquor at ambient temperature, batching up and allowing them to stand on a roller for 3 hours or more or over night, followed by washing with water and drying.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali of alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzene-sulfonic acid or aminonaphthalenesulfonic acid, or an addition product between stearylamine and ethylene oxide, and the like.

The present triazine compound can be characterized by excellent dye performance in the dyeing and printing of fiber materials, particularly cellulose fiber materials. For examplee, the compound can give a dyed product excellent in light fastness, perspiration-light fastness, formalin fastness, wet fastness such as washing resistance, peroxide-washing resistance, chlorine resistance, chlorine bleaching resistance, perspiration resistance and acid-hydrolysis resistance, and alkali fastness, abrasion fastness and iron fastness. The triazine compound can also exhibit extremely excellent build-up, level-dyeing and washing-off properties and high solubility as well as high exhaustion and fixation percentages. Moreover, when used for the dyeing or printing, the triazine compound can hardly be affected by changes in dye-bath conditions such as temperatures, pH, amounts of inorganic salts and bath ratio, so that a dyed or printed product with a constant quality can be obtained with superior reproducibility.

Further, particularly when applied for the dyeing by the cold batch-up dyeing method, the triazine compound can exhibit excellent build-up property and alkali stability (almost no hydrolysis by the action of the alkali agent) and almost no difference in the depth and shade appears between the dyed products obtained by fixing at 25° C. and at a lower temperature than that.

The present invention is illustrated in more detail with reference to the following Examples, which are only illustrative, but not limitative. In Examples, all parts and % are by weight.

EXAMPLE 1

1-Amino-8-hydroxy-7-(o-sulfophenylazo)-3,6-naphthalenedisulfonic acid (50.4 parts) was dissolved in water (500 parts), and cyanuric chloride (18.5 parts) was added thereto. The mixture was stirred at 0° to 5° C., while controlling the pH within 2 to 3, to complete a first condensation.

To this reaction mixture, an aqueous solution of 1-(4'-aminobenzoylamino)benzene-3-β-sulfatoethylsulfone (40 parts) was slowly added, and the resulting mixture was stirred at 40° to 50° C., while controlling the pH within 4 to 5, to complete a second condensation. The reaction mixture was mixed with sodium chloride to precipitate crystals. The crystals were separated on a filter, washed and dried to obtain a triazine compound of the following formula in a free acid form.

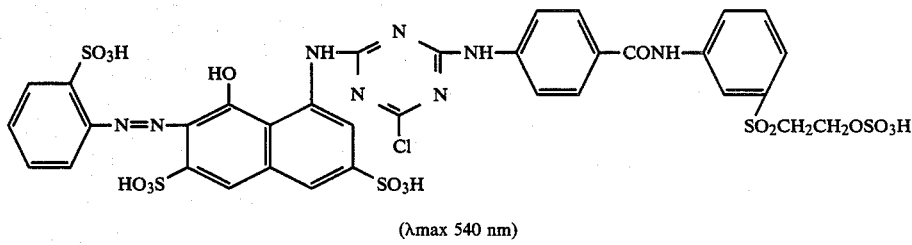

(λmax 540 nm)

EXAMPLES 2 TO 31

Example 1 was repeated, provided that the first and second condensation reactions were carried out using the compound of the formula (IV) as shown in a second column of the following table, cyanuric chloride or fluoride as shown in a third column, in which Cl and F mean cyanuric chloride and cyanuric fluoride, respectively, and the compound of the formula (III) as shown in a fourth column, thereby obtaining the corresponding triazine compound, which was used for dyeing cellulose fibers to give a dyed product of a shade as shown in a fifth column.

| Example No. | Compound of Formula (IV) | Cyanuric chloride or fluoride | Compound of Formula (III) | Shade |
|---|---|---|---|---|
| 2 | SO₃H, HO, NH₂, HO₃S, SO₃H with azo-phenyl-SO₃H | Cl | H₂N-C₆H₄-N(C₂H₅)-CONH-C₆H₄-SO₂CH=CH₂ (3-substituted) | Red |
| 3 | " | " | H₂N-C₆H₄-N(C₂H₅)-CO-C₆H₄-SO₂CH₂CH₂OSO₃H | " |
| 4 | " | " | H₂N-C₆H₄-CONH-C₆H₄-SO₂CH₂CH₂SSO₃H | " |
| 5 | " | F | H₂N-naphthyl-CONH with SO₂CH₂CH₂OSO₃H and SO₃H | " |
| 6 | SO₃H, HO, NH₂, HO₃S, SO₃H with azo-phenyl-SO₃H | Cl | H₂N-C₆H₄-CONH-C₆H₄-SO₂CH₂CH₂OSO₃H (3-substituted) | Red |
| 7 | NH₂, HO, SO₃H, HO₃S naphthyl-N=N-phenyl(SO₂CH₂CH₂OSO₃H)-SO₃H | " | " | " |

-continued

| Example No. | Compound of Formula (IV) | Cyanuric chloride or fluoride | Compound of Formula (III) | Shade |
|---|---|---|---|---|
| 8 | 2-methoxy-5-sulfo-phenylazo / 1-hydroxy-3-sulfo-6-amino-naphthalene derivative | " | 4-amino-phenyl-CONH-phenyl-SO$_2$CH$_2$CH$_2$OSO$_3$H (meta) | Orange |
| 9 | 2-methoxy-5-sulfo-phenylazo / 1-hydroxy-4-sulfo-7-(NHCH$_3$)-naphthalene derivative | " | " | " |
| 10 | 1,5-disulfo-naphthyl-2-azo / 8-amino-1-hydroxy-6-sulfo-naphthalene | Cl | 4-amino-phenyl-CONH-phenyl-SO$_2$CH$_2$CH$_2$OSO$_3$H (meta) | Orange |
| 11 | 1-sulfo-naphthyl-2-azo / 8-amino-1-hydroxy-6-sulfo-naphthalene | F | " | Bluish red |
| 12 | 2-sulfo-5-amino-phenylazo / 1-hydroxy-8-(NHCOC$_2$H$_5$)-3-sulfo-naphthalene derivative | Cl | 4-amino-phenyl-CONH-naphthyl-SO$_2$CH$_2$CH$_2$OSO$_3$H | Red |

-continued

| Example No. | Compound of Formula (IV) | Cyanuric chloride or fluoride | Compound of Formula (III) | Shade |
|---|---|---|---|---|
| 13 | (naphthalene with SO₃H, OH, NH-C(=O)-phenyl, SO₃H, and azo link to benzene bearing SO₃H, SO₃H, NH₂) | " | H₂N–C₆H₄–CONH–C₆H₄–SO₂CH₂CH₂OSO₃H | " |
| 14 | (naphthalene with NHCO–C₆H₄–NH₂, OH, SO₃H, and azo to benzene with SO₃H, SO₃H) | Cl | H₂N–C₆H₄–CONH–C₆H₄–SO₂CH₂CH₂OSO₃H | Red |
| 15 | " | " | H₂N–C₆H₄–CONH–C₆H₄–SO₂CH₂CH₂OSO₃H | " |
| 16 | (naphthalene with SO₃H, HO₃S, azo to benzene with NH₂, NHCONH₂) | " | " | Yellow |
| 17 | (naphthalene with SO₃H, SO₃H, azo to benzene with NH₂, NHCOCH₃) | " | H₂N–C₆H₄–CON(CH₃)–C₆H₄–SO₂CH₂CH₂OSO₃H | " |

-continued

| Example No. | Compound of Formula (IV) | Cyanuric chloride or fluoride | Compound of Formula (III) | Shade |
|---|---|---|---|---|
| 18 | Cu complex: 2-amino-4-sulfophenyl–O–Cu–COO–(5-sulfo-2-hydroxyphenyl)–N=N–C(2-sulfophenyl)=N–NH | Cl | H₂N–C₆H₄–CONH–C₆H₄–SO₂CH₂CH₂OSO₃H (3-sulfonatoethylsulfonyl) | Blue |
| 19 | Cu complex (as above, phenyl instead of 2-sulfophenyl) | " | H₂N–C₆H₄–CONH–C₆H₄–SO₂CH₂CH₂OSO₃H | Blue |
| 20 | " | F | 3-H₂N–C₆H₄–CONH–C₆H₄(4-SO₂CH₂CH₂OSO₃H) | " |
| 21 | 8-amino-1-hydroxy-naphthalene-3,6-disulfonic acid bis-azo (2-sulfo-5-aminophenyl / 4-sulfophenyl) | Cl | H₂N–C₆H₄–CONH–C₆H₄–SO₂CH₂CH₂OSO₃H | Navy blue |

-continued
| Example No. | Compound of Formula (IV) | Cyanuric chloride or fluoride | Compound of Formula (III) | Shade |
|---|---|---|---|---|
| 22 | 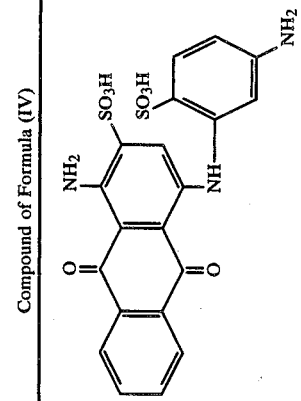 | " | " | " |
| 23 | 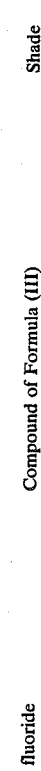 | " | 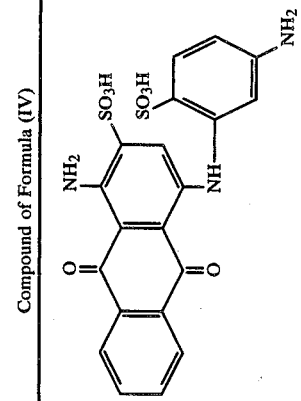 | blue |
| 24 | 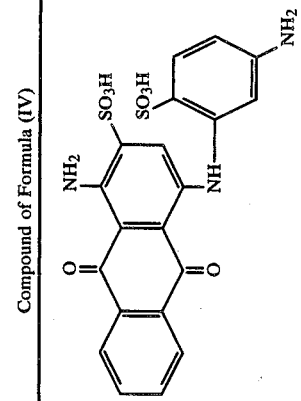 | " |  | Turquoise blue |
| 25 |  | Cl | 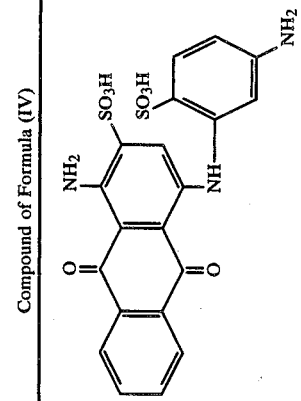 | Turquoise blue |

-continued

| Example No. | Compound of Formula (IV) | Cyanuric chloride or fluoride | Compound of Formula (III) | Shade |
|---|---|---|---|---|
| 26 | [structure: HO₃SH₂C, CH₃, N-C₂H₅, OH, =N, NH₂, SO₃H pyridone azo] | F | " | Yellow |
| 27 | [structure: HO₃SOCH₂CH₂O₂S-C₆H₄-N=N-naphthol with H₂N, OH, HO₃S, SO₃H, and azo linkage to benzene with SO₃H, NH₂] | Cl | " | Navy blue |
| 28 | [Cu complex structure with naphthalene NH₂, SO₃H, O-Cu-O, N=N, HO₃S, SO₃H] | Cl | [structure: H₂N-C₆H₄-CONH-C₆H₄-SO₂CH₂CH₂OSO₃H] | Rubine |
| 29 | [structure: COCH₃, OCH₃, CONH, CH, N=N-naphthalene(SO₃H)₂, NH₂, SO₃H] | " | " | Yellow |
| 30 | " | F | [structure: H₂N-C₆H₄-CONH-C₆H₄-SO₂CH₂CH₂OSO₃H] | " |

-continued

| Example No. | Compound of Formula (IV) | Cyanuric chloride or fluoride | Compound of Formula (III) | Shade |
|---|---|---|---|---|
| 31 | H₂NH₄C₂HN—[benzene ring with SO₃H]—O—[quinone ring with Cl, Cl]—N=[benzene ring with SO₃H, NHC₂H₄NH₂]<br>0.5 equivalent | Cl<br>1 equivalent | H₂N—[benzene]—CONH—[benzene]—SO₂CH₂CH₂OSO₃H<br>1 equivalent | Blue |

DYEING EXAMPLE 1

The triazine compounds (each 0.3 part) obtained in Examples 1 to 31 were respectively dissolved in water (200 parts). Sodium sulfate (10 parts) and cotton (10 parts) was added thereto, and the dyebath was heated to 60° C. 20 Minutes thereafter, sodium carbonate (4 parts) was added thereto, and dyeing was continued for 1 hour at that temperature. Thereafter, the cotton taken out of the bath was washed with water and soaped to obtain a dyed product excellent in fastness properties with superior dye performance. Even when the dyebath conditions including temperatures, bath ratio and amount of the inorganic salt were varied to some extent, a dyed product of invariable quality was obtained with superior reproducibility.

DYEING EXAMPLE 2

| Composition of color paste | |
|---|---|
| Each triazine compound obtained in Examples 1 to 31 | 5 parts |
| Urea | 5 parts |
| Sodium alginate (5%), thickener | 50 parts |
| Hot water | 25 parts |
| Sodium hydrogencarbonate | 2 parts |
| Balance (water) | 13 parts |

Mercerized cotton broad cloth was printed with the color paste of the above composition, pre-dried, steamed at 100° C. for 5 minutes, washed with hot water, soaped, again washed with hot water and dried, thereby obtaining a printed product excellent in fastness properties with superior dye performance.

DYEING EXAMPLE 3

Each triazine compound obtained in Examples 1 to 31 (25 parts) was dissolved in hot water, and the solution was cooled to 25° C. 32.5% Aqueous sodium hydroxide solution (5.5 parts) and 50° Be′ water glass (150 parts) were added thereto, and water was added to make the whole 1000 parts at 25° C. to obtain a padding liquor. Immediately thereafter, cotton cloth was padded with the padding liquor and batched up, and the cloth wrapped tightly with a polyethylene film was allowed to stand in a room kept at 20° C.

Above manner was repeated to obtain a padded cotton cloth, which was then wrapped tightly with a polyethylene film, and allowed to stand in a room kept at 5° C.

Both cloths were allowed to stand for 20 hours, and thereafter washed with cold water and then hot water, soaped with a boiling detergent, washed with cold water and then dried.

There was observed almost no difference in their color shade and depth between the dyed products obtained after standing at 5° C. and 20° C. each for 20 hours. In this cold batch-up dyeing method, each triazine compound was found to have superior build-up property.

What is claimed is:

1. A compound represented by the formula,

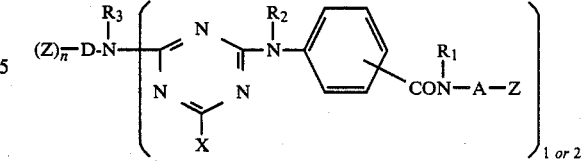

wherein X is chloro or fluoro, $R_1$, $R_2$ and $R_3$ independently of one another are each hydrogen or alkyl unsubstituted or substituted with hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo or sulfamoyl, A is unsubstituted phenylene or naphthylene unsubstituted or substituted with sulfo, Z is $-SO_2CH=CH_2$ or $-SO_2CH_2CH_2Y$ in which Y is a group splittable by the action of an alkali, D is an anionic dye moiety, and n is 0, 1 or 2.

2. A compound according to claim 1, wherein D is a moiety of anionic dye selected from metal-containing or metal-free azo, anthraquinone, metal-containing phthalocyanine, metal-containing formazan, dioxazine or stilbene dyes.

3. A compound according to claim 1, wherein D is the one represented by the following formulas,

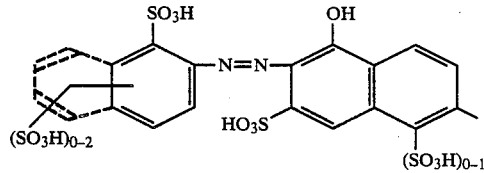

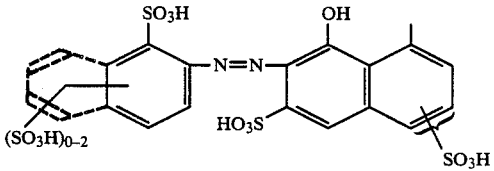

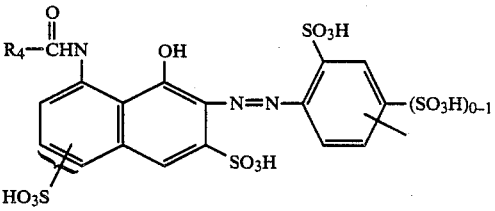

wherein $R_4$ is $C_{1-4}$ alkyl or phenyl unsubstituted or substituted by chloro, sulfo or nitro;

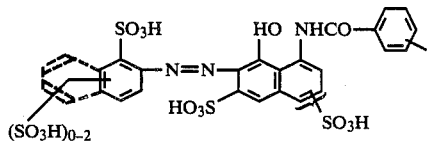

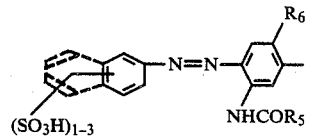

wherein $R_5$ is amino, $C_{1-4}$ alkyl or phenyl, and $R_6$ is hydrogen, $C_{1-4}$ alkyl or $C_{1-4}$ alkoxy;

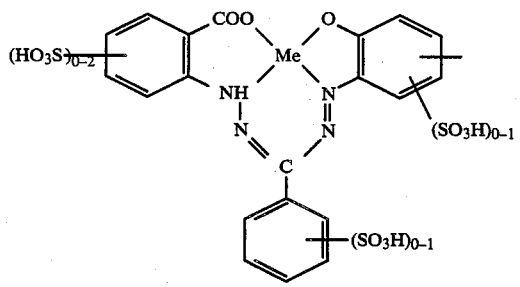

wherein Me is Cu, Ni or Co;

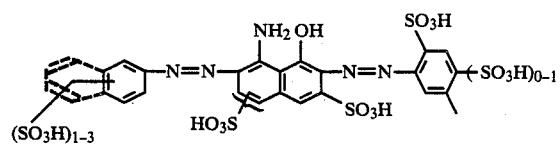

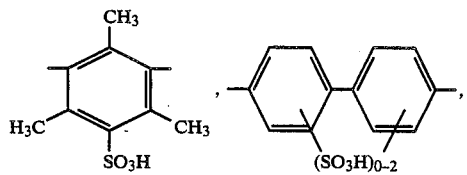

wherein W is $C_{2-6}$ alkylene or a divalent group of the formula,

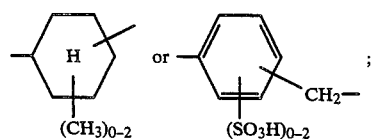

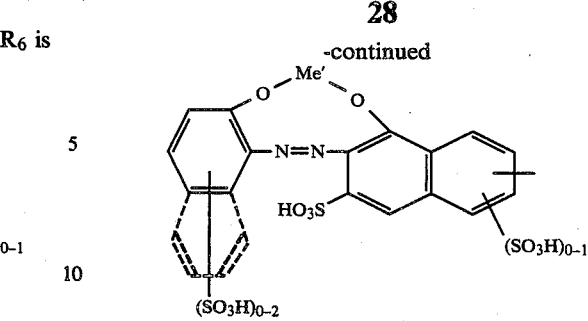

wherein Me' is Cu, Ni, Co1/2 or Cr1/2;

$$[Pc] \begin{matrix} (SO_3H)a \\ (SO_2NH_2)b \\ (SO_2-B-)c \end{matrix}$$

wherein Pc is copper phthalocyanine or nickel phthalocyanine moiety, a, b and c satisfy the following formulas, $1 \leq a \leq 2$, $0 \leq b \leq 2$, $1 \leq c \leq 2$ and $a+b+c \leq 4$, and B is a divalent group of the following formula, $$-NHCH_2CH_2-, \quad -\underset{CH_3}{N}-CH_2CH_2-,$$

$$-N\underset{\phantom{xx}}{\diagup\!\!\!\diagdown} N \text{ or}$$

$$-N\underset{(SO_3H)_{0-2}}{\overset{(HOOC)_{0-1}}{\diagdown}}(CH_2)_{\phantom{x}0-1};$$

[structure with $N=N-CH(COCH_3)CONH$ group, $(SO_3H)_{1-3}$, $R_7$, $R_8$]

wherein $R_7$ and $R_8$ independently of one another are each sulfo or $C_{1-4}$ alkoxy;

[structure: $-T-NH$—phenyl—O—dichlorobenzoquinonediimine—O—phenyl—$NH-T-$ with $SO_2-V$ groups]

wherein V is hydroxy, vinyl or $\beta$-sulfatoethyl, and T is $C_{2-6}$ alkylene or [phenyl with $(SO_3H)_{0-2}$] ; and

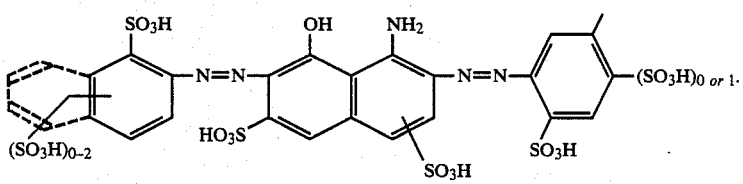

4. A compound according to claim 1, wherein A is unsubstituted phenylene or naphthylene unsubstituted or substituted once by sulfo, and Z is —SO$_2$CH=CH$_2$, —SO$_2$CH$_2$CH$_2$OSO$_3$H, —SO$_2$CH$_2$CH$_2$OCOCH$_3$, —SO$_2$CH$_2$CH$_2$SSO$_3$H, —SO$_2$CH$_2$CH$_2$Cl, or —SO$_2$CH$_2$CH$_2$OPO$_3$H$_2$.

5. A compound according to claim 1, wherein R$_1$, and R$_3$ independently of one another are each hydrogen, methyl or ethyl.

6. A compound represented by the formula,

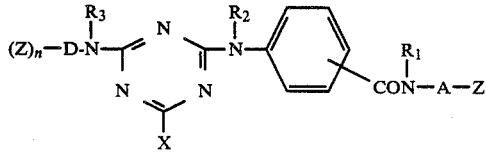

wherein X is chloro or fluoro, R$_1$, R$_2$, and R$_3$ independently of one another are each hydrogen or alkyl unsubstituted or substituted with hydroxy, cyano, C$_{1-4}$ alkoxy, halogeno, carboxy, carbamoyl, C$_{1-4}$ alkoxycarbonyl, C$_{1-4}$ alkylcarbonyloxy, sulfo or sulfamoyl, A is unsubstituted phenylene or naphthylene unsubstituted or substituted with sulfo, Z is —SO$_2$CH=CH$_2$ or —SO$_2$CH$_2$CH$_2$Y in which Y is a group splittable by the action of an alkali, D is an anionic dye moiety, and n is 0, 1 or 2.

7. A compound according to claim 6, wherein R$_1$, R$_2$ and R$_3$ each independently of one another are hydrogen, methyl or ethyl, and n is 0.

8. A compound according to claim 6, wherein R$_1$, R$_2$ and R$_3$ are each hydrogen, X is chloro, A is unsubstituted phenylene and Z is —SO$_2$CH$_2$CH$_2$OSO$_3$H or —SO$_2$CH=CH$_2$.

* * * * *